(12) United States Patent
Bauman et al.

(10) Patent No.: US 6,820,182 B1
(45) Date of Patent: Nov. 16, 2004

(54) SUPPORT FOR EXHAUSTION RECOVERY IN A DATA PROCESSING SYSTEM WITH MEMORY MIRRORING

(75) Inventors: Charles David Bauman, Sammamish, WA (US); Richard Bealkowski, Redmond, WA (US); Thomas J Clement, Raleigh, NC (US); Jerry William Pearce, Apex, NC (US); Michael Robert Turner, Carnation, WA (US)

(73) Assignee: International Business Machines Corporation, Armonk, NY (US)

( * ) Notice: Subject to any disclaimer, the term of this patent is extended or adjusted under 35 U.S.C. 154(b) by 576 days.

(21) Appl. No.: 09/691,533

(22) Filed: Oct. 18, 2000

(51) Int. Cl.[7] .............................................. G06F 12/00
(52) U.S. Cl. ........................... 711/170; 711/5; 711/114; 711/117; 711/120; 711/124; 711/167; 707/204; 714/6; 714/770
(58) Field of Search .............................. 707/204; 714/6, 714/770; 711/5, 114, 117, 120, 124, 167, 170

(56) References Cited

U.S. PATENT DOCUMENTS

| | | | |
|---|---|---|---|
| 5,432,922 A | | 7/1995 | Polyzois et al. |
| 5,542,065 A | * | 7/1996 | Burkes et al. .............. 711/114 |
| 5,546,558 A | | 8/1996 | Jacobson et al. |
| 5,751,997 A | | 5/1998 | Kullick et al. |
| 5,819,310 A | | 10/1998 | Vishlitzky et al. |
| 5,893,919 A | | 4/1999 | Sarkozy et al. |
| 5,896,492 A | | 4/1999 | Chong, Jr. |
| 5,974,506 A | | 10/1999 | Sicola et al. |
| 5,987,566 A | | 11/1999 | Vishlitzky et al. |
| 6,006,307 A | | 12/1999 | Cherukuri |
| 6,055,604 A | * | 4/2000 | Voigt et al. ................. 711/117 |
| 6,151,665 A | * | 11/2000 | Blumenau ................... 711/162 |
| 6,397,307 B2 | * | 5/2002 | Ohran ......................... 711/161 |
| 6,442,659 B1 | * | 8/2002 | Blumenau ................... 711/162 |
| 6,549,995 B1 | * | 4/2003 | Schulz et al. ............... 711/202 |

* cited by examiner

Primary Examiner—Donald Sparks
Assistant Examiner—Bao Quoc Truong
(74) Attorney, Agent, or Firm—Dillon & Yudell, LLP

(57) ABSTRACT

A memory exhaustion condition is handled in a data processing system having first and second regions of physical memory. The memory exhaustion condition is detected while the second region is mirroring at least part of the first region. In response to the memory exhaustion condition, memory mirroring is at least partially deactivated and at least part of the second region is utilized to augment the first region, such that the memory exhaustion condition is eliminated. In an illustrative embodiment, the data processing system compresses real memory into the first region of physical memory, and the memory exhaustion condition arises when the first region lacks sufficient available capacity to accommodate current requirements for real memory. The memory exhaustion condition is eliminated by compressing at least part of the real memory into the second region.

18 Claims, 4 Drawing Sheets

| BSEL1 | BSEL0 | |
|---|---|---|
| 0 | 0 | Mirror Bank0 on Bank3 |
| 0 | 1 | Mirror Bank1 on Bank3 |
| 1 | 0 | Mirror Bank2 on Bank3 |
| 1 | 1 | Use Bank3 as the high bank of a 4-bank array |

Fig. 3

| MR | |
|---|---|
| 0 | Read from primary bank |
| 1 | Read from Bank3 in lieu of primary bank |

Fig. 4

SUPPORT FOR EXHAUSTION RECOVERY IN A DATA PROCESSING SYSTEM WITH MEMORY MIRRORING

BACKGROUND OF THE INVENTION

1. Technical Field:

The present invention relates in general to data processing systems and in particular to data processing systems that support memory mirroring. Still more particularly, the present invention relates to systems for managing memory in data processing systems that support memory mirroring.

2. Description of the Related Art:

In the field of data processing systems, a design feature that can be employed in high-availability data processing systems is memory mirroring. Memory mirroring maintains a redundant copy of system memory. For example, if a system with two banks of random access memory (RAM) has memory mirroring, the first bank (e.g., Bank A) might be utilized as the primary bank, and the second bank (e.g., Bank B) might be utilized as a backup or mirror bank. The mirror bank serves as a repository for an extra copy of the data contained in the primary bank. In the event of errors in primary Bank A, the system avoids an interruption in service by utilizing mirror Bank B in lieu of primary Bank A. An error message may then be generated indicating that Bank A requires service.

A disadvantage associated with memory mirroring, however, is that less of the installed memory is available for general use. For example, in the above example, Bank A is available for general use, but Bank B is not. When all of the primary memory is mirrored onto mirror memory, the system is said to have full mirroring, in which case only half of the installed memory is available for general use. Alternatively, partial mirroring can be implemented. For example, a system with four banks of memory, (e.g., Banks A through D) may be configured to mirror Bank A onto Bank B but not to mirror Banks C and D. Partial mirroring provides for general use of a larger percentage of installed memory but less protection against memory errors.

Another design feature that can be employed to provide mirrored systems (as well as non-mirrored systems) with more apparent memory for general use is memory compression. A typical system with memory compression has a compression engine that utilizes the system's installed memory (i.e., physical memory) to support a larger amount of apparent memory (i.e., real memory). For example, if a system includes 32 MB of physical memory and a compression engine configured to provide a compression ratio of 2:1, the compression engine will report real memory of 64 MB. Consequently, if a system with 32 MB of installed memory has full mirroring and memory compression at a ratio of 2:1, the effects of the compression and mirroring offset each other. That is, the system will have a real memory size that equals its physical memory size.

A danger associated with memory compression, however, is that the configured compression ratio may not be obtainable for certain types of data. For example, if the data has already been compressed by software (e.g., if the data is a Joint Photographic Experts Group (JPEG) file), the compression engine may not be able to further compress the file enough to provide a 2:1 ratio. Furthermore, if the compression engine fails to achieve the desired compression ratio and substantially all of the real memory is needed, the system may be unable to provide the required amount of real memory. When a system lacks sufficient physical memory to support all of the required real memory, the system is said to have suffered a condition known as memory exhaustion. However, memory exhaustion may also occur in systems without compression, for example if the system simply has insufficient physical memory to perform required processing.

In conventional systems, exhausting physical memory is a critical system problem. That problem is typically signaled via an appropriately high priority event, such as a non-maskable interrupt (NMI) or a form of machine check. Consequently, in conventional systems, when memory compression and memory mirroring are used together, there will generally be a decreased risk of system failure due to memory errors but an increased risk of system failure due to memory exhaustion.

Consequently, what is needed is a way to reduce the risk of system failure due to memory exhaustion, especially in systems that utilize memory compression.

SUMMARY OF TEE INVENTION

According to the present invention, a memory exhaustion condition is handled in a data processing system having first and second regions of physical memory. In one particular method according to the present invention, a memory exhaustion condition is detected while the second region is mirroring at least part of the first region. In response to the memory exhaustion condition, memory mirroring is at least partially deactivated. The memory exhaustion condition is then eliminated by augmenting the first region with at least part of the second region.

In an illustrative embodiment, the data processing system compresses real memory into the first region of physical memory, and the memory exhaustion condition is detected when the first region lacks sufficient available capacity to accommodate current requirements for real memory. The memory exhaustion condition is eliminated by compressing at least part of the real memory into the second region.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use and further objects and advantages thereof, will best be understood by reference to the following detailed description of an illustrative embodiment when read in conjunction with the accompanying drawings, wherein:

FIG. 3 is a table illustrating possible settings of memory-bank select bits for configuring mirroring according to an illustrative embodiment of the present invention;

FIG. 4 is a table depicting possible settings of a mirror-mode read bit for configuring mirroring according to an illustrative embodiment of the present invention.

DETAILED DESCRIPTION OF ILLUSTRATIVE EMBODIMENT

Figure 1A:
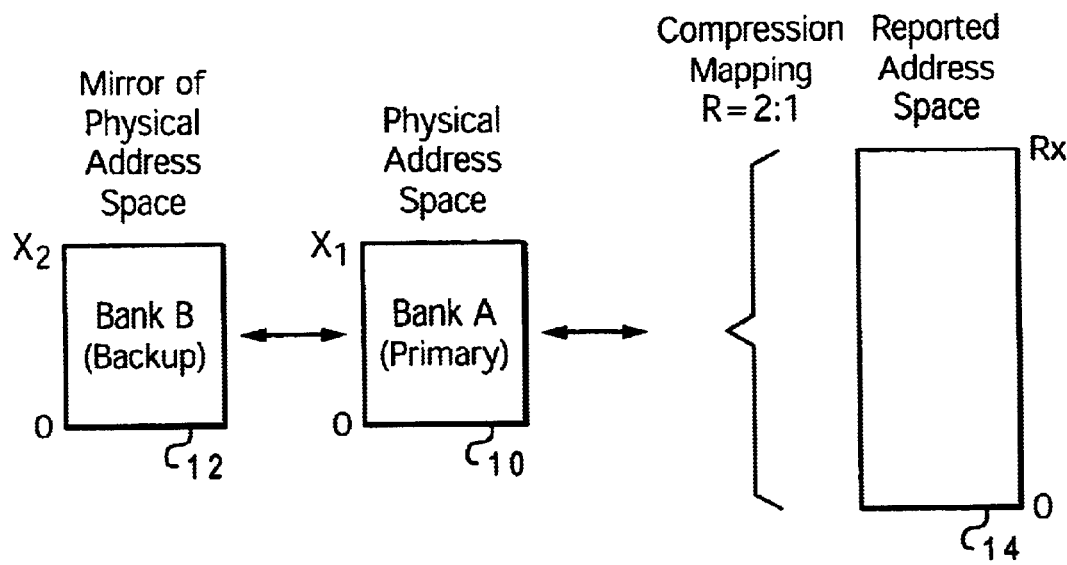
FIGS. 1A and 1B depict block diagrams explaining the relationship between physical memory and real memory with mirroring enabled (in FIG. 1A) and disabled (in FIG. 1B) according to an illustrative embodiment of the present invention.

With reference now to the figures, and in particular with reference to FIGS. 1A and 1E, there are depicted two block diagrams explaining the relationship between physical memory and real memory in a data processing system with a memory subsystem that supports mirroring in accordance with a relatively uncomplicated illustrative embodiment of the present invention. Specifically, the diagrams relate to a data processing system that has two banks of memory of equal capacity, Bank A 10 and Bank B 12. In FIG. 1A, the data processing system is configured in such a way that Bank A 10 serves as a primary bank and Bank B 12 serves as a mirror of Bank A 10. In addition, the data processing system supports memory compression, such that the memory subsystem reports an address space for real memory 14 that exceeds the address space of the primary bank (i.e., Bank A 10).

To describe the relationship between primary memory and real memory more precisely, this document utilizes the following symbols in the following manner:

X is the size of the physical, primary memory;

X(m) is the size of the physical memory serving as a mirror;

R is the compression ratio that the memory subsystem seeks to achieve (expressed as real-memory:primary-memory); and Rx is the size of the real memory, as reported by the memory subsystem.

In FIG. 1A, R equals 2:1 and X equals $X_1$; consequently, Rx equals $2 * X_1$. Also, X(m) equals $X_2$.

Figure 1B:
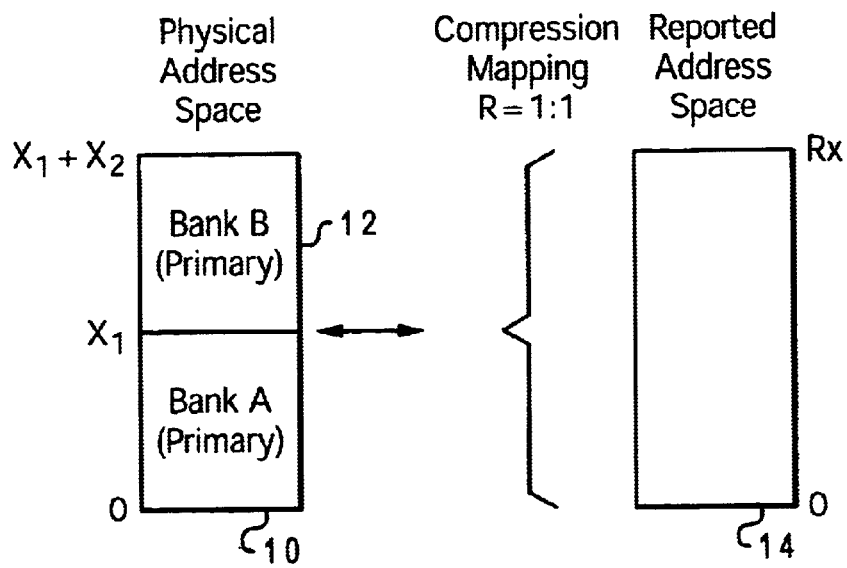

Referring now to FIG. 1B, there is depicted a block diagram relating to the data processing system of FIG. 1A with, however, the memory subsystem having been reconfigured so that Bank B 12 serves as primary memory, not mirror memory. According to the present invention, such a reconfiguration may be performed automatically upon the occurrence of a memory exhaustion condition, as described in greater detail below. In the present illustrative embodiment, as a result of the reconfiguration, R equals 1:1 and X equals $X_1+X_2$; consequently, Rx equals $1 * (X_1+X_2)$. Also, X(m) equals 0. Thus, additional physical memory is allocated to support needs for real memory, at the expense of loss of mirroring.

Figure 2:
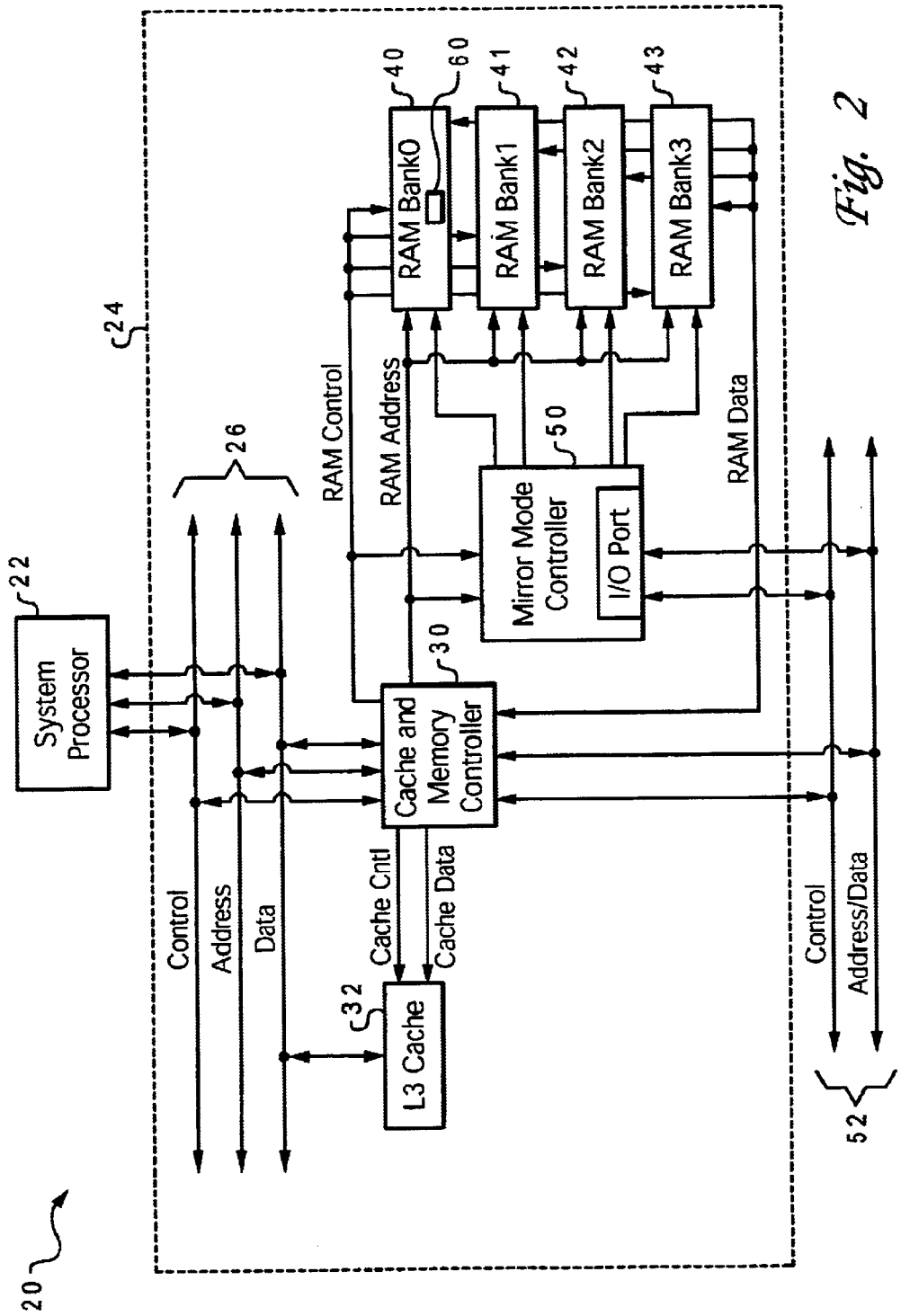
FIG. 2 illustrates a block diagram of an exemplary data processing system with facilities, in accordance with the present invention, for handling memory exhaustion conditions.

With reference now to FIG. 2, there is illustrated a block diagram of a slightly more complex a exemplary data processing system 20 with facilities for handling memory exhaustion conditions in accordance with the present invention. As illustrated, data processing system 20 includes a system processor 22 that communicates with a memory subsystem 24 via a host bus 26. Memory subsystem 24 includes a cache and memory controller (CMC) 30 which supports an L3 cache 32. In addition, CMC 30 communicates with four banks of installed random access memory (RAM), Bank 0 40, Bank 1 41, Bank 2 42, and Bank 3 43, both directly and via a mirror mode controller (MMC) 50. Other components (not illustrated) of data processing system 20 may communicate with memory subsystem 24 via a peripheral component interconnect(PCI) bus 52.

MMC 50 contains a three-bit latch that can be written and read by system processor 22 to alter the mirroring characteristics of memory subsystem 24. The latch appears as a normal I/O port.

Referring now also to FIG. 3, two bits of that latch are bank-select bits. By setting or clearing the bank-select bits to achieve the bit patterns illustrated in FIG. 3, system processor 22 can alter how Bank 3 43 is used. Bank 3 43 is therefore said to have variable addressing. In particular, when at least one of bank-select bits 0 and 1 is cleared, Bank 3 43 serves as a mirror bank for one of the primary banks. Such a configuration therefore implements partial-mirroring. By contrast, when bank-select bits 0 and 1 are both set, mirroring is deactivated, and Bank 3 43 serves instead as another primary bank, for example as the high bank in a four bank array.

Referring now also to FIG. 4, the third bit in the latch is a mirror-read bit which, when clear, causes memory reads to utilize a primary bank and, when set, causes memory reads to utilize the mirror bank in lieu of the corresponding primary bank. At this point, it may be noted that, if Bank 1 41 and Bank 2 42 were null and the capacities of Bank 0 40 and Bank 3 43 were equal, the system depicted in FIG. 2 would resemble or match the system described with reference to FIGS. 1A and 1B.

The operation of memory subsystem 24 is governed by a memory manager 60 which, in the illustrative embodiment, is implemented as part of the operating system. Accordingly, memory manager 60 is loaded into RAM during the system boot process, along with other operating system components.

Figure 5:
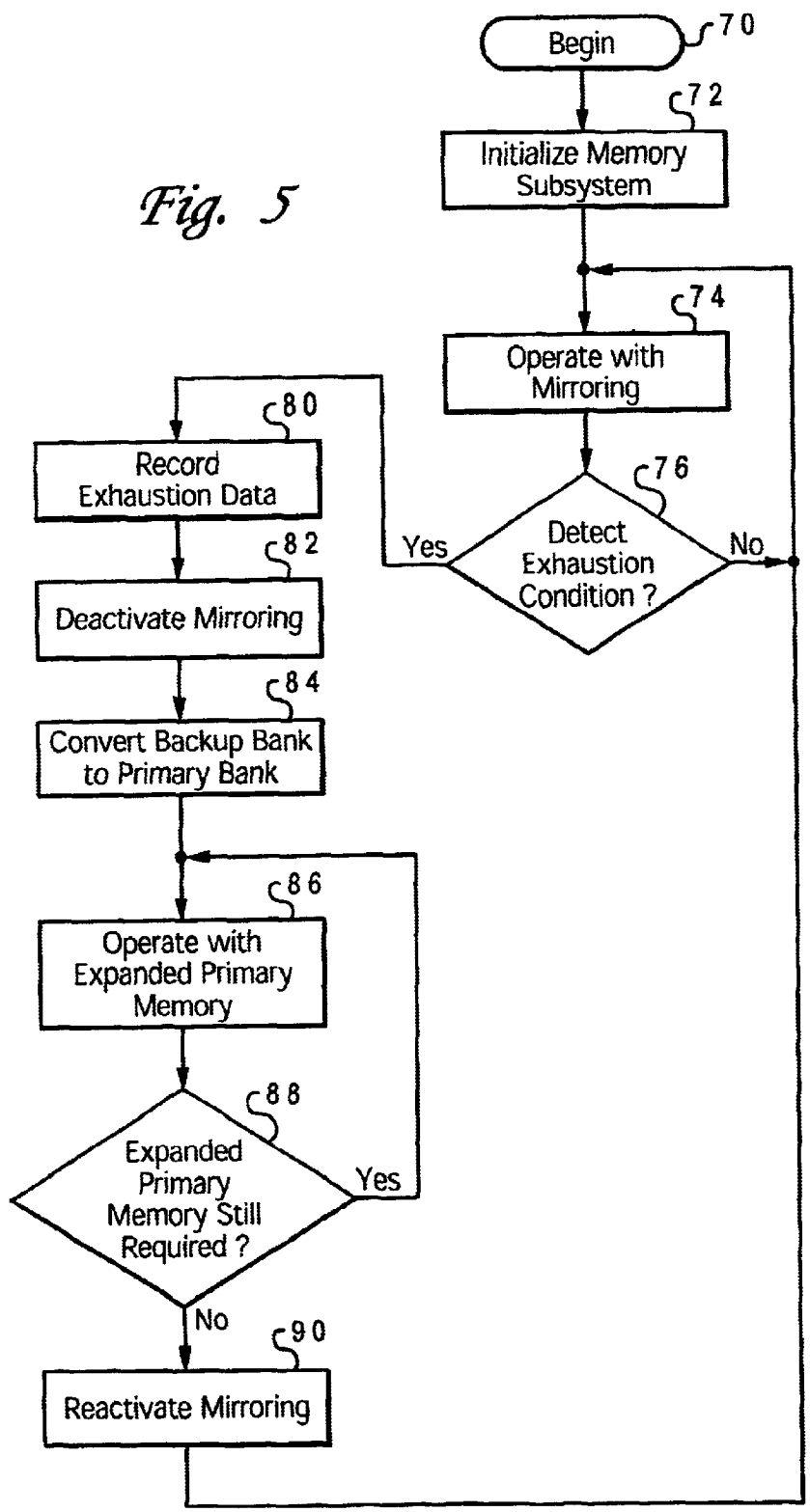
FIG. 5 illustrates a high-level logical flowchart of an exemplary process, according to the present invention, for handling memory exhaustion conditions.

With reference now to FIG. 5, there is illustrated a high-level logical flowchart of an exemplary process, according to the present invention, for handling memory exhaustion conditions within data processing system 20. The process begins at block 70 with data processing system 20 being powered up. Then, as part of the boot process, memory subsystem 24 is initialized, as depicted at block 72. As part of the initialization process, CMC 30 determines how much physical memory is installed and memory manager 60 configures the bank-select and mirror-read bits within MMC 50 according to a default configuration. In the current exemplary process, MMC 50 will be configured for partial mirroring with Bank 0 40 mirrored onto Bank 3 43.

A compression ratio may also be determined during this initialization process. In one embodiment, that ratio is determined based on historical compression performance, so that the initialized compression ratio may be automatically adjusted over time to more closely match the compression ratios that have actually been achieved during one or more prior operating cycles. In the present example, the compression ratio will be set at 2:1.

After the memory subsystem has been initialized, data processing system 20 begins normal operation, as depicted at block 74, with the memory subsystem operating as configured in the initialization process. During normal operation, combinational logic controls the generation of the chip select and output enable signals for each memory bank. This logic utilizes the high-order memory address lines, the bank-select bits, the system R/W line, and the mirror-read bit to generate the required signals and timing. In mirror mode, all writes to a mirrored primary bank (here, Bank 0 40) also write to the corresponding mirror bank (here, Bank 3 43). In addition, CMC 30 maintains usage tables for tasks such as allocating unused memory as needed and properly mapping real memory to physical memory.

During processing, CMC 30 utilizes L3 cache 32 to obtain recently accessed data, as data can be read from L3 cache 32 more quickly than from RAM. However, when the required data is not in L3 cache 32, (i.e., when there is a cache miss), it is necessary to access RAM. Specifically, in the present illustrative embodiment, cache misses cause CMC 30 to read a compressed block of data from RAM, decompress the data, and load the data into the L3 cache. For a cache flush operation, the data to be written is compressed and written to RAM. The memory usage tables of CMC 30 are updated accordingly.

As illustrated at block 76, while system processor 22 executes instructions, memory manager 60 monitors memory subsystem 24 to detect whether a memory exhaustion condition exists (i.e., whether the primary memory lacks sufficient available capacity to accommodate current requirements for real memory). For example, CMC 30 may be configured to generate a non-maskable interrupt or machine check when there simply is not enough physical memory to store the compressed contents of real memory, due to, for example, a request for additional real memory or a modification of existing memory contents. Alternatively, it may be determined that a memory exhaustion condition exists when current requirements for real memory cause the remaining capacity of unused physical memory to fall below a certain threshold.

If no memory exhaustion condition is detected, processing continues with mirroring, as indicated by the arrow returning to block 74. However, if a memory exhaustion condition is detected, the process passes to block 80, which depicts memory manager 60 recording information pertaining to the memory exhaustion condition for use in adapting the configured compression ratio to align more closely with compression ratios that have actually been achieved. Specifically, in the current exemplary process, memory manager 60 computes a new compression ratio and stores that compression ratio in non-volatile storage. Acceptable storage mediums for this data include, without limitation, non-volatile (e.g., battery-backed) RAM (i.e., NVRAM), complementary metal-oxide semiconductor (CMOS) RAM, flash memory, and magnetic or optical disks. In alternative embodiments, however, other types of exhaustion information may be stored.

After a memory exhaustion condition has been detected, memory manager 60 also reconfigures CMC 30 and MMC 50 (including setting both bank-select bits) to deactivate mirroring and convert Bank 3 43 from a mirror bank to a primary bank, preferably as the high bank of a four-bank array, as depicted at blocks 82 and 84. As a result, the amount of available primary memory is expanded, which eliminates the memory exhaustion condition. Then, as illustrated at block 86, system processor 22 resumes normal operation, utilizing the expanded primary memory.

Also, as shown at block 88, after normal processing has resumed, memory manager 60 monitors conditions to determine whether the expanded primary memory is still needed. If so, processing continues, as indicated by the arrow leading back to block 86. However, if real memory requirements have subsided to the point that Bank 3 43 is no longer needed as a primary bank, memory manager 60 reconfigures CMC 30 and MMC 50 to reactivate mirroring, as depicted at block 90. Within the process of reactivating mirroring, the mirror bank is repopulated with data to match the corresponding primary bank. This repopulation can be performed by software or by hardware. System processor 22 then resumes normal operations, as indicated by the arrow leading back to block 74.

As has been described, the present invention handles memory exhaustion conditions by dynamically reconfiguring mirror banks to be primary banks. In addition, mirroring is reactivated when memory needs subside sufficiently. Furthermore, in data processing systems that provide memory compression, the invention provides for the automatic adjustment of the startup compression ratio, based on how much compression has actually been realized in a particular data processing system.

While the invention has been particularly shown and described with reference to one or more illustrative embodiments, it will be understood by those skilled in the art that various changes in form and detail may be made therein without departing from the spirit and scope of the invention. For example, particular illustrative embodiments involving full and partial mirroring have been present. However alternative embodiments with different numbers of memory banks and different mirroring proportions are supported as well, including data processing systems with N-way mirroring (i.e., data processing system with two or more mirror copies of data from one or more primary memory banks). Accordingly, the present invention also supports partial deactivation of mirroring to eliminate memory exhaustion conditions. For example, if a system is initially configured to utilize two or more banks of memory for mirroring, the system may respond to memory exhaustion conditions by reconfiguring one mirror bank as a primary bank and leaving mirroring active for the other mirror bank. Furthermore, although the illustrative embodiments provide memory compression, the present invention can also be utilized to advantage in systems without compression.

Also, although certain architectures have been utilized to illustrate exemplary embodiments, the present invention could be utilized with other architectures, as well. For example, the present invention could be implemented in data processing systems including, without limitation, general-purpose personal computers, multi-processor systems, mini-computers, and mainframe computers.

In addition, various operations of the present invention have been described as being performed by various components, including memory manager 60, CMC 30, and MMC 50. However, those of ordinary skill in the art will appreciate that, to a certain extent, the operations performed according to the present invention could be distributed among those components differently. In addition, the implementation of certain components as hardware, software, and/or firmware can be altered without departing from the spirit of the present invention.

For example, memory manager 60 could be implemented partially or entirely in hardware and/or firmware. Likewise, rather than having a memory controller that generates signals such as interrupts to be processed by software, a data processing system with hardwired logic that controls mirroring may include hardwired detection logic that detects memory exhaustion conditions, as well as configuration logic that is hardwired to the detection logic in such a way that the configuration logic automatically disables mirroring and converts mirror banks into primary banks when necessary.

Also, although aspects of the present invention have been described with respect to a computer system executing software that directs the functions of the present invention, it should be understood that the present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method of handling a memory exhaustion condition in a data processing system having first and second regions of physical memory, said method comprising:
   detecting a memory exhaustion condition in said first region of physical memory while said second region of physical memory is mirroring at least part of said first region;
   in response to said memory exhaustion condition, at least partially deactivating memory mirroring between said first and second regions;
   augmenting said first region with at least part of said second region, such that said memory exhaustion condition is eliminated;
   determining that memory needs have diminished after said at least partially deactivating memory mirroring between said first and second regions; and
   in response to said determining that memory needs have diminished, at least partially reactivating mirroring.

2. The method of claim 1, said data processing system compressing real memory into said first region of physical memory, wherein:
   said step of detecting a memory exhaustion condition comprises determining that said first region lacks sufficient available capacity to accommodate current requirements for real memory; and
   said step of augmenting said first region comprises compressing at least part of said required real memory into said at least part of said second region.

3. The method of claim 2, further comprising:
   in response to said memory exhaustion condition, recording data relating to said memory exhaustion condition; and
   subsequently utilizing said data to set a compression ratio for memory compression.

4. The method of claim 1, said data processing system having a mirror mode controller that directs a memory access to said first region or said second region in accordance with one or more mirror mode bits, wherein:
   said step of augmenting said fist region comprises modifying at least one of said one or more mirror mode bits.

5. A data processing system comprising:
   first and second regions of physical memory;
   detection logic that detects a memory exhaustion condition in said first region of physical memory while said second region of physical memory is mirroring at least part of said first region;
   a mirror mode controller that directs a memory access to said first region or said second region in accordance with one or more mirror mode bits; and
   configuration logic that, responsive to said memory exhaustion condition, at least partially deactivates memory mirroring between said first and second regions and augments said first region with at least part of said second region, such that said memory exhaustion condition is eliminated, and wherein said configuration logic augments said first region by modifying at least one of said one or more mirror mode bits.

6. The data processing system of claim 5, wherein:
   said data processing system compresses real memory into said first region of physical memory;
   said detection logic comprises a memory controller that detects said memory exhaustion condition by determining that said first region lacks sufficient available capacity to accommodate current requirements for real memory; and
   said configuration logic comprises a memory manager that augments said first region by configuring said memory controller to compress at least part of said real memory into said at least part of said second region.

7. The data processing system of claim 6, wherein:
   in response to said memory exhaustion condition, said memory manager records data relating to said memory exhaustion condition; and
   said memory manager subsequently utilizes said data to set a compression ratio for memory compression.

8. A program product that handles a memory exhaustion condition in a data processing system having a memory controller, first and second regions of physical memory, and a mirror mode controller that directs a memory access to said first region or said second region in accordance with one or more mirror mode bits, said program product comprising:
   a computer usable medium encoding a memory manager;
   deactivation instructions within said memory manager that at least partially deactivate memory mirroring between said first and second regions in response to a memory exhaustion condition arising in said first region of said physical memory while said second region of said physical memory is mirroring at least part of said first region; and
   augmentation instructions within said memory manager that cause said memory controller to augment said first region with at least part of said second region, such that said memory exhaustion condition is eliminated, and wherein said memory manager augments said first region by modifying at least one of said one or more mirror mode bits.

9. The program product of claim 8, said data processing system compressing real memory into said fist region of physical memory, and said memory controller detecting said memory exhaustion condition by determining that said first region lacks sufficient available capacity to accommodate current requirements for real memory, wherein:
   said memory manager augments said first region by configuring said memory controller to compress at least part of said real memory into said at least part of said second region.

10. The program product of claim 9, wherein:
    in response to said memory exhaustion condition, said memory manager records data relating to said memory exhaustion condition; and
    said memory manager subsequently utilizes said data to set a compression ratio for memory compression.

11. The program product of claim 8, wherein:
    after mirroring has been at least partially deactivated, said memory manager determines that memory needs have diminished; and
    in response to said memory manager determining memory needs have diminished, said memory manager at least partially reactivates mirroring.

12. A memory management system that handles a memory exhaustion condition in a data processing system having first and second regions of physical memory, said memory management system comprising:
    detection logic that detects a memory exhaustion condition in said first region of said physical memory while said second region or said physical memory is mirroring at least part of said first region;
    configuration logic that, responsive to said memory exhaustion condition, at least partially deactivates memory mirroring between said first and second regions and augments said first region with at least part of said second region, such that said memory exhaustion condition is eliminated; and a mirror mode controller that directs a memory access to said first region or said second region in accordance with one or more mirror mode bits; wherein said configuration logic augments said first region by modifying at least one of said one or more mirror mode bits.

13. The memory management system of claim 12, said data processing system compressing real memory into said first region of physical memory, wherein:

said detection logic comprises a memory controller that detects said memory exhaustion condition by determining that said first region lacks sufficient available capacity to accommodate current requirements for real memory; and said configuration logic comprises a memory manager that augments said first region by configuring said memory controller to compress at least part of said real memory into said at least part of said second region.

14. The memory management system of claim 13, wherein:

in response to said memory exhaustion condition, said memory manager records data relating to said memory exhaustion condition; and said memory manager subsequently utilizes said data to set a compression ratio for memory compression.

15. The memory management system of claim 12, wherein:

after memory mirroring has been at least partially deactivated, said configuration logic determines that memory needs have diminished; and in response to said configuration logic determining that memory needs have diminished, said configuration logic at least partially reactivates mirroring.

16. A data processing system comprising:

first and second regions of physical memory;

detection logic that detects a memory exhaustion condition while said second region is mirroring at least part of said first region; and configuration logic that, responsive to said memory exhaustion condition, at least partially deactivates memory mirroring between said first and second regions and augments said first region with at least part of said second region, such that said memory exhaustion condition is eliminated, wherein after memory mirroring has been at least partially deactivated, said configuration logic determines that memory needs have diminished, and wherein in response to said configuration logic determining that memory needs have diminished, said configuration logic at least partially reactivates mirroring.

17. A method comprising:

detecting a memory exhaustion condition of a first region of physical memory while a second region of physical memory is mirroring at least part of said first region of physical memory, and in response to said memory exhaustion condition, at least partially deactivating memory mirroring between said first and second regions of physical memory and augmenting said first region with at least part of said second region, such that said memory exhaustion condition is eliminated, wherein after memory mirroring has been at least partially deactivated, determining that memory needs have diminished, and wherein in response to determining that memory needs have diminished, at least partially reactivating mirroring.

18. A computer program product, residing on a computer usable medium, comprising:

program code for detecting a memory exhaustion condition of a first region of physical memory while a second region of physical memory is mirroring at least part of said first region of physical memory; and program code for in response to said memory exhaustion condition, at least partially deactivating memory mirroring between said first and second regions of physical memory and augmenting said first region with at least part of said second region, such that said memory exhaustion condition is eliminated, wherein after memory mirroring has been at least partially deactivated, determining that memory needs have diminished, and wherein in response to determining that memory needs have diminished, at least partially reactivating mirroring.

* * * * *